United States Patent
Sato

(10) Patent No.: US 10,255,348 B2
(45) Date of Patent: Apr. 9, 2019

(54) INFORMATION MANAGING DEVICE, INFORMATION MANAGING METHOD, AND NON-TRANSITORY RECORDING MEDIUM

(71) Applicant: PUBCEN INC., Maebashi-shi, Gunma (JP)

(72) Inventor: Takao Sato, Gunma (JP)

(73) Assignee: Pubcen Inc., Maebashi-shi, Gunma (JP)

( * ) Notice: Subject to any disclaimer, the term of this patent is extended or adjusted under 35 U.S.C. 154(b) by 131 days.

(21) Appl. No.: 15/358,244

(22) Filed: Nov. 22, 2016

(65) Prior Publication Data

US 2017/0154097 A1   Jun. 1, 2017

(30) Foreign Application Priority Data

Nov. 26, 2015  (JP) .................. 2015-230952

(51) Int. Cl.
| | | |
|---|---|---|
| G06F 17/30 | (2006.01) | |
| G06T 3/40 | (2006.01) | |
| H04L 29/08 | (2006.01) | |

(52) U.S. Cl.
CPC .... *G06F 17/30598* (2013.01); *G06F 17/3028* (2013.01); *G06F 17/3089* (2013.01); *G06F 17/30327* (2013.01); *G06F 17/30557* (2013.01); *G06F 17/30882* (2013.01); *G06T 3/40* (2013.01); *H04L 67/10* (2013.01)

(58) Field of Classification Search
CPC .................. G06F 17/3028; G06F 17/30598
See application file for complete search history.

(56) References Cited

U.S. PATENT DOCUMENTS

| | | | | |
|---|---|---|---|---|
| 6,263,364 | B1 * | 7/2001 | Najork | G06F 17/30864 707/E17.108 |
| 2005/0267922 | A1 * | 12/2005 | Nakajima | G06F 17/30244 |
| 2007/0073776 | A1 * | 3/2007 | Kalalian | G06F 17/30274 |
| 2009/0187857 | A1 * | 7/2009 | Tanaka | G06F 3/0481 715/811 |

(Continued)

FOREIGN PATENT DOCUMENTS

| | | |
|---|---|---|
| JP | 2001-325275 A | 11/2001 |
| JP | 2010-66994 A | 3/2010 |

(Continued)

OTHER PUBLICATIONS

Japanese Office Action dated Sep. 2, 2016 from corresponding Japanese Patent Application No. 2015-230952, 9 pages.

*Primary Examiner* — Mahesh H Dwivedi
(74) *Attorney, Agent, or Firm* — Ohlandt, Greeley, Ruggiero & Perle, L.L.P.

(57) ABSTRACT

An information managing device detects target management information to manage the target management information held by each of a plurality of information holding servers connected to the information managing device via a network, and generates link information for accessing the detected target management information via the network. Next, the information managing device obtains accompanying information accompanying to the target management information from each of the plurality of information holding servers, and classifies the accompanying information in accordance with the predefined layer structure. Subsequently, the link information is displayed on a display in association with the classified accompanying information.

6 Claims, 17 Drawing Sheets

MANAGEMENT DATA (133)

| MANAGEMENT ID | LINK | POSTED DATE AND TIME | IMAGING LOCATION | IMAGED PERSON | ALBUM NAME | SUB LINK | SUB POSTED DATE AND TIME |
|---|---|---|---|---|---|---|---|
| 1 | YYY_1 | 2015/9/30 21:00 | HOT SPRING P | X | HOTSPRINGTRIP_2015 Sep | — | — |
| 2 | YYY_2 | 2015/9/30 21:00 | HOT SPRING P | X | HOTSPRINGTRIP_2015 Sep | — | — |
| 3 | YYY_3 | 2015/9/30 21:00 | HOT SPRING P | X | HOTSPRINGTRIP_2015 Sep | — | — |
| 4 | XXX_1 | 2015/10/23 12:00 | MUSEUM Q | Z | — | — | — |
| 5 | XXX_2 | 2015/10/23 22:00 | PARK R | X, Y | FUTSAL_2015 Oct | YYY_4 | 2015/10/24 10:00 |
| 6 | XXX_3 | 2015/10/23 22:00 | PARK R | X, Y | FUTSAL_2015 Oct | — | — |
| 7 | XXX_4 | 2015/10/23 22:00 | PARK R | X, Y | FUTSAL_2015 Oct | — | — |

(56) References Cited

U.S. PATENT DOCUMENTS

| | | | | |
|---|---|---|---|---|
| 2012/0188382 | A1* | 7/2012 | Morrison | G06F 17/30247 |
| | | | | 348/207.1 |
| 2013/0018868 | A1* | 1/2013 | Chi | G06F 17/30545 |
| | | | | 707/722 |
| 2013/0066964 | A1* | 3/2013 | Odio | G06Q 50/01 |
| | | | | 709/204 |
| 2013/0067354 | A1* | 3/2013 | O'Shaugnessy | G06Q 10/107 |
| | | | | 715/752 |
| 2013/0097172 | A1* | 4/2013 | McIntosh | G06F 17/3002 |
| | | | | 707/741 |
| 2013/0212534 | A1* | 8/2013 | Knight | G06F 3/04817 |
| | | | | 715/838 |
| 2014/0074836 | A1* | 3/2014 | Adams | G06F 17/30997 |
| | | | | 707/736 |
| 2014/0358868 | A1* | 12/2014 | Costecalde | G06F 17/30303 |
| | | | | 707/692 |
| 2014/0359009 | A1* | 12/2014 | Shih | H04L 67/306 |
| | | | | 709/204 |

FOREIGN PATENT DOCUMENTS

| | | |
|---|---|---|
| JP | 2013-127712 A | 6/2013 |
| JP | 2014-26614 A | 2/2014 |
| JP | 2015-018288 A | 1/2015 |
| JP | 2015-148868 A | 8/2015 |

* cited by examiner

FIG.4

| 117 | FIRST SNS DATA | | | | | | | |
|---|---|---|---|---|---|---|---|---|
| POSTING ID | USER | POSTED DATE AND TIME | COMMENT | IMAGE ID | IMAGE | IMAGING LOCATION | IMAGED PERSON | ALBUM NAME |
| 1 | AAA | 2015/10/23 12:00 | — | 1 | D | MUSEUM Q | — | — |
| 2 | AAA | 2015/10/23 22:00 | PLAYED FUTSAL TODAY | 2 | A | PARK R | X, Y | FUTSAL_2015_Oct |
| | | | | 3 | B | | | |
| | | | | 4 | C | | | |

| \multicolumn{6}{|c|}{SECOND SNS DATA} |
|---|---|---|---|---|---|
| POSTING ID | USER | POSTED DATE AND TIME | COMMENT | IMAGE ID | IMAGE |
| 1 | AAA | 2015/9/30 21:00 | AT HOT SPRING P | 1 | E |
| | | | | 2 | F |
| | | | | 3 | G |
| 2 | AAA | 2015/10/24 10:00 | PLAYED FUTSAL AT PARK R! | 4 | A |

| SCHEDULE DATA FOR AAA | | | |
|---|---|---|---|
| DATE AND TIME | DETAILS | LOCATION | MEMBER |
| 2015/9/29 – 2015/9/30 | HOT SPRING TRIP | HOT SPRING P | X |
| 2015/10/23 10:00-12:00 | GO TO ○○ EXHIBITION | MUSEUM Q | Z |
| 2015/10/23 20:00-21:00 | FUTSAL | PARK R | X, Y |

FIG.12

| MANAGEMENT ID | LINK | POSTED DATE AND TIME | MANAGEMENT DATA ||||| SUB POSTED DATE AND TIME |
|---|---|---|---|---|---|---|---|
| | | | IMAGING LOCATION | IMAGED PERSON | ALBUM NAME | SUB LINK | |
| 1 | YYY_1 | 2015/9/30 21:00 | HOT SPRING P | X | HOTSPRINGTRIP_2015 Sep | — | — |
| 2 | YYY_2 | 2015/9/30 21:00 | HOT SPRING P | X | HOTSPRINGTRIP_2015 Sep | — | — |
| 3 | YYY_3 | 2015/9/30 21:00 | HOT SPRING P | X | HOTSPRINGTRIP_2015 Sep | — | — |
| 4 | XXX_1 | 2015/10/23 12:00 | MUSEUM Q | Z | — | — | — |
| 5 | XXX_2 | 2015/10/23 22:00 | PARK R | X, Y | FUTSAL_2015 Oct | YYY_4 | 2015/10/24 10:00 |
| 6 | XXX_3 | 2015/10/23 22:00 | PARK R | X, Y | FUTSAL_2015 Oct | — | — |
| 7 | XXX_4 | 2015/10/23 22:00 | PARK R | X, Y | FUTSAL_2015 Oct | — | — |

| CLASSIFICATION ENTRY DATA ||| 
|---|---|---|
| CLASSIFICATION ENTRY ID | CLASSIFICATION ENTRY NAME | PARENT CLASSIFICATION ENTRY |
| 1 | POSTED DATE AND TIME | — |
| 2 | 2015 | POSTED DATE AND TIME |
| 3 | 2015-09 | 2015 |
| 4 | 2015-09-30 | 2015-09 |
| ⋮ | ⋮ | ⋮ |
| 15 | IMAGED PERSON | — |
| 16 | X | IMAGED PERSON |
| 17 | Y | IMAGED PERSON |
| 18 | Z | IMAGED PERSON |

136

INFORMATION MANAGING DEVICE, INFORMATION MANAGING METHOD, AND NON-TRANSITORY RECORDING MEDIUM

CROSS-REFERENCE TO RELATED APPLICATION

This application claims the benefit of Japanese Patent Application No. 2015-230952, filed on Nov. 26, 2015, the entire disclosure of which is incorporated by reference herein.

FIELD

This application relates generally to an information managing device, an information managing method, and a non-transitory recording medium.

BACKGROUND

Services called a Social Networking Service (SNS) and utilizing the Internet have become popular. Some SNS users utilize multiple SNSs to transmit information. In the case of such user who utilizes multiple SNSs, the utilization of multiple SNS sometimes causes the users to confuse what information the user has transmitted and from which SNS the information has been transmitted.

For example, Unexamined Japanese Patent Application Kokai Publication No. 2014-26614 discloses a searching and information displaying system that has a user-posting-detail automatic searching function that is a function of automatically searching based on the posted details of an interlinked user by the user over the SNS.

According to Unexamined Japanese Patent Application Kokai Publication No. 2014-26614, the controller gives the SNS account of the user to a search engine, obtains the details of transmitted information by the user over the SNS like a tweet, and stores archives in the service at a time point at which the user interlinks the SNS account. Next, information contained in the archives will be subjected to a search, and only the posted details by the user can be made available for the search. Hence, the activity details of the user at the same time of year in past are reviewable.

According to the searching and information displaying system disclosed in Unexamined Japanese Patent Application Kokai Publication No. 2014-26614, as explained above, at the time point at which the user interlinks the SNS account, the archives are stored in the service. Hence, the data quantity of archives becomes quite large. Consequently, the management sometimes becomes difficult in practice due to, for example, a preparation of a device that is capable of storing and processing such a large quantity of data, and costs thereof.

SUMMARY

The present disclosure has been made in view of the foregoing circumstances, and an objective is to provide an information managing device, an information managing method, and a non-transitory recording medium which are capable of managing target management information uploaded to multiple information holding servers like SNS servers at a little data quantity.

In order to accomplish the above objective, an information managing device according to a first aspect of the present disclosure manages target management information held by each of a plurality of information holding servers connected to the information managing device via a network, and the information managing device includes:

a detector that detects the target management information held by each of the plurality of information holding servers;

a link information generator that generates link information for accessing the detected target management information via the network;

an accompanying information obtainer that obtains accompanying information accompanying to the target management information from each of the plurality of information holding servers;

a classifier that classifies the accompanying information obtained by the accompanying information obtainer in accordance with a predefined layer structure; and a display that displays the link information generated by the link information generator in association with the accompanying information classified by the classifier.

The target management information may be image information, and the link information generator may generate a scaled-down image, which size is a predefined size, from the target management information as the link information.

When the detector detects the same target management information from at least some of the plurality of information holding servers, the display may display the link information for accessing the target management information held by the information holding of which predefined priority is high, in association with the accompanying information classified by the classifier.

When the accompanying information is not obtained from the plurality of information holding servers, the accompanying information obtainer may obtain the accompanying information from a schedule managing server that holds schedule data registering a user schedule via the network.

In order to accomplish the above objective, an information managing method according to a second aspect of the present disclosure is of managing target management information held by each of a plurality of information holding servers connected to an information managing device via a network, and the information managing method includes:

detecting the target management information held by each of the plurality of information holding servers;

generating link information for accessing the detected target management information via the network;

obtaining accompanying information accompanying to the target management information from each of the plurality of information holding servers;

classifying the accompanying information obtained in the obtaining in accordance with a predefined layer structure; and displaying the link information generated in the generating in association with the accompanying information classified in the classifying.

In order to accomplish the above objective, a non-transitory computer readable recording medium according to a third aspect of the present disclosure has stored therein a program for managing target management information held by each of a plurality of information holding servers connected to an information managing device via a network, and the program causes a computer connected to the network to function as:

a detector that detects the target management information held by each of the plurality of information holding servers;

a link information generator that generates link information for accessing the detected target management information via the network;

an accompanying information obtainer that obtains accompanying information accompanying to the target management information from each of the plurality of information holding servers;

a classifier that classifies the accompanying information obtained by the accompanying information obtainer in accordance with a predefined layer structure; and a display that displays the link information generated by the link information generator in association with the accompanying information classified by the classifier.

BRIEF DESCRIPTION OF THE DRAWINGS

A more complete understanding of this application can be obtained when the following detailed description is considered in conjunction with the following drawings, in which:

FIG. 4 is a diagram illustrating example first SNS data;

FIG. 12 is a diagram illustrating example management data;

FIG. 16 is a diagram illustrating example classification entry data;

DETAILED DESCRIPTION

Figure 1:
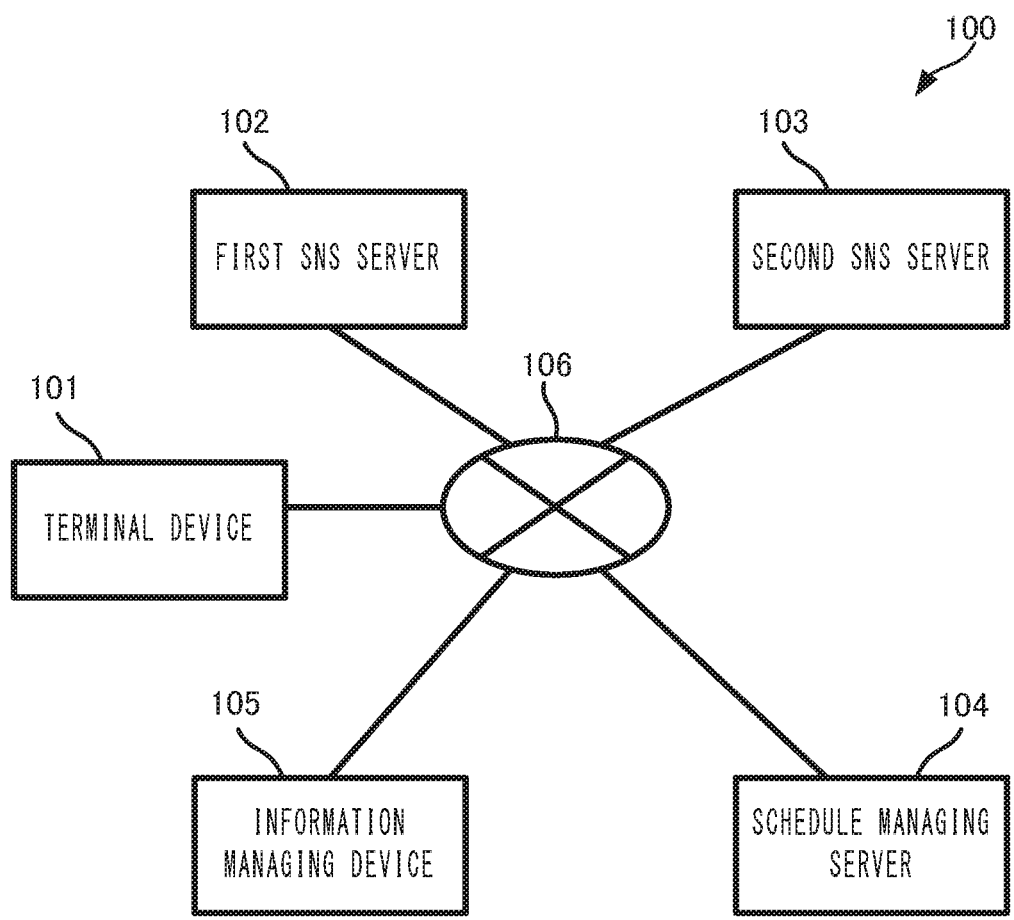
FIG. 1 is a diagram illustrating a structure of an information managing system according to an embodiment of the present disclosure.

An embodiment of the present disclosure will be explained below with reference to the figures. The same structural component will be denoted by the same reference numeral throughout all figures.

An information managing system 100 according to an embodiment of the present disclosure is to manage target management information that is image information uploaded to a first Social Networking Service (SNS) server 102 and a second SNS server 103 by a user from a terminal device 101.

As illustrated in FIG. 1, the information managing system 100 includes the terminal device 101 utilized by the user, the first SNS server 102 and the second SNS server 103 that provide different SNSs, respectively, a schedule managing server 104 that manages the user schedule, and an information managing device 105 that manages the target management information that is the image information. The first SNS server 102, the second SNS server 103, the schedule managing server 104, and the information managing device 105 are all connected together via a network 106 constructed by a wired technology or a wireless technology, or a combination thereof, and are capable of communicating with each other via the network 106.

In this embodiment, the explanation will be given of an example case in which the two SNS servers are provided, but the information managing system 100 may include equal to or greater than three SNS servers.

The terminal device 101 is a smartphone, a tablet terminal, or the like, enables the user to upload information to each server 102-104, and to check the managed image information by the information managing device 105 via a screen.

Figure 2:
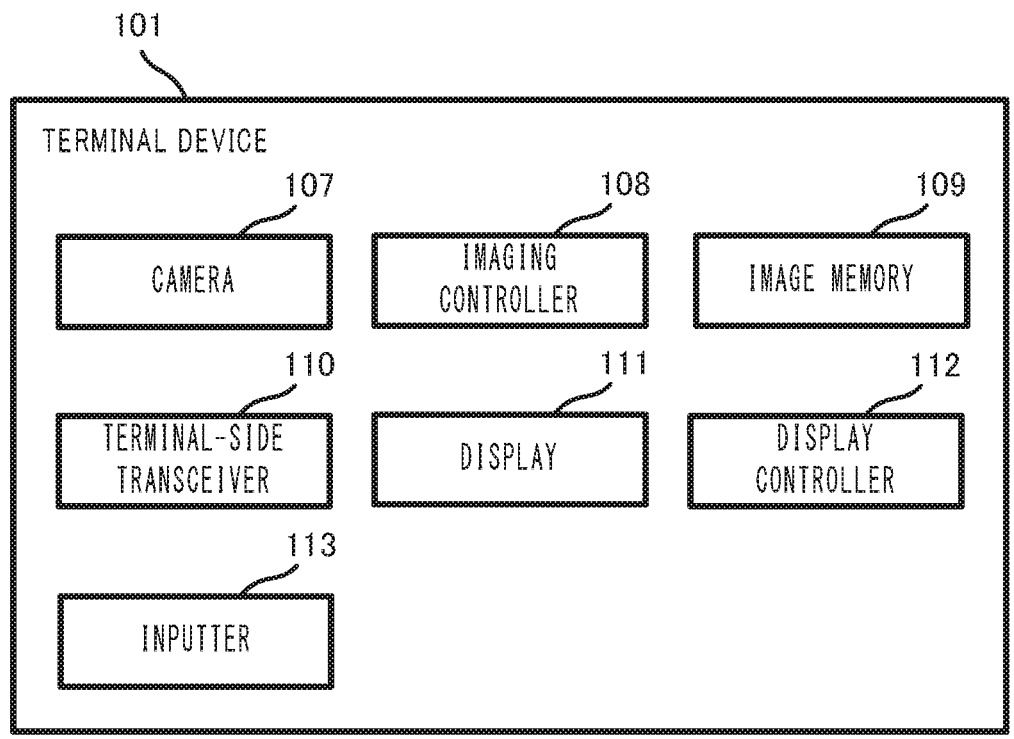
FIG. 2 is a diagram illustrating a functional structure of a terminal device according to an embodiment.

More specifically, as illustrated in FIG. 2, the terminal device 101 includes a camera 107, an imaging controller 108, an image memory 109, a terminal-side transceiver 110, a display 111, a display controller 112, and an inputter 113.

The camera 107 is a device that picks up an image.

The imaging controller 108 controls the camera 107 to pick up the image in accordance with a user operation, and stores, in the image memory 109, image information indicating the picked-up image together with information on, for example, the location where the image is picked up (imaging location information). The image information also contains imaging date-and-time information indicating the date and time at which the image is picked up.

The imaging location information is associated with the image information at the time of imaging when obtainable using, for example, a Global Position System (GPS) function of the terminal device 101. Note that the imaging location information may be entered by the user via the inputter 113.

The image memory 109 is, for example, a flash memory that stores the image information. When there is accompanying information like the imaging location information associated with the image information, the image memory 109 also stores the accompanying information.

The terminal-side transceiver 110 is a communication interface that transmits and receives information relative to the first SNS server 102, the second SNS server 103, the schedule managing server 104, and the information managing device 105 via the network 106.

The display 111 includes a liquid crystal panel, or the like, and displays the information on the screen.

The display controller 112 controls the display 111 to display an image that includes information which are to be transmitted and received relative to the first SNS server 102, the second SNS server 103, the schedule managing server 104, and the information managing device 105, and which are arranged in accordance with a predetermined format.

The inputter 113 is a component operated by the user to enter the information. The inputter 113 constructs a touch panel together with the display 111.

The first SNS server 102 and the second SNS server 103 are each a server device that provides a social networking service that makes various information like the uploaded image information by the user available to the public. The first SNS server 102 and the second SNS server 103 are each typically accomplished by a general-purpose computer in which a software to provide the social networking service is installed.

Figure 3:
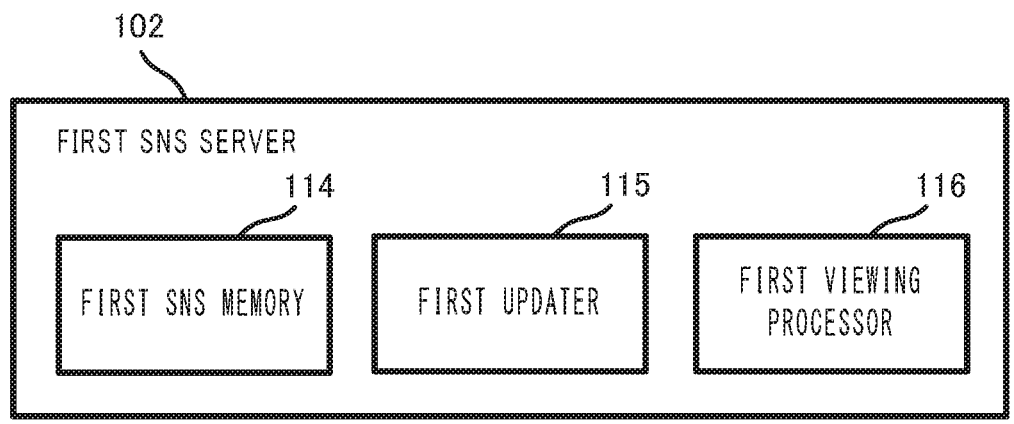
FIG. 3 is a diagram illustrating a functional structure of a first SNS server according to an embodiment.

As illustrated in FIG. 3, the first SNS server 102 includes functional structures that are a first SNS memory 114, a first updater 115, and a first viewing processor 116.

The first SNS memory 114 stores first SNS data 117 that contains various information like the image information uploaded by the user from the terminal device 101. The first SNS memory 114 includes a flash memory, a Hard Disk Drive (HDD), or the like.

As illustrated in FIG. 4, the first SNS data 117 according to this embodiment is data that includes entries "posting Identification Data (ID)", "user", "posted date and time", "comment", "image ID", "image", "imaging location", "imaged person", and "album name" associated with each other. In the illustrated example, in order to simplify the explanation for easier understanding, data per a user is illustrated as an example, but the first SNS data 117 is stored in the memory user by user. The same is true of second SNS data 121 to be explained later.

The entry "posting ID" is information to identify each first SNS data 117, and in this embodiment, a sequential number in accordance with an updated sequence is adopted.

The entry "user" is information to identify the user who has uploaded various information, and for example, is set up as appropriate together with an unillustrated authentication password for updating and viewing when the user is registered in the SNS provided by the first SNS server 102.

The entry "posted date and time" is information indicating the date and time at which various information has been uploaded. The entry "posted date and time" may be set beforehand in accordance with, for example, the date and time at which the first updater 115 has received various information, and the date and time at which the first SNS memory 114 has stored various information.

The entry "comment" is comment information indicating a comment entered and uploaded by the user from the terminal device 101, and contains, for example, characters, numbers, symbols, and the like, entered by the user from the terminal device 101. In this case, in FIG. 4, the symbol "—" indicates that no information has been set.

The entry "image ID" is information to identify each image information contained in the first SNS data 117. The entry "image ID" according to this embodiment is a sequential number in accordance with an updated sequence.

The entry "image" is the image information, that is, the information indicating an uploaded image by the user from the terminal device 101. When a plurality of image information are collectively received, like "A", "B", and "C" in the entry "image" in FIG. 4, the entry "image" is associated with the plurality of image information relative to one "posting ID" contained in the first SNS data 117.

The entry "imaging location" is the imaging location information indicating the location where the image is picked up. The imaging location information may be associated with the uploaded image information from the terminal device 101, or may be entered and set by the user via the terminal device 101.

The entry "imaged person" is imaged person information to identify a person like the name of a person in the image information. This imaged person information will be explained later in detail.

The entry "album name" is information indicating a name given to identify each group when the plurality of image information are managed as groups. For example, the entry "album name" may be set and entered by the user via the terminal device 101.

In this case, the entries "posted date and time", "comment", "imaging location", and "album name" are example accompanying information, that is, information accompanying to the image information that is the target management information according to this embodiment.

With reference to FIG. 3, the first updater 115 generates, when obtaining various information like the image information from the operated terminal device 101 by the user via the network 106, the first SNS data 117 based on the obtained various information, and stores the generated data in the first SNS memory 114.

More specifically, when obtaining the comment information, the imaging location information and the album name information together with the image information, the first updater 115 obtains the imaged person information contained in the image information if possible.

For example, some SNSs have a function of interlinking several users as friends, and holding the image information on the face of each user. The imaged person information may be identified by the first updater 115 based on whether or not the face of the other user interlinked with the user who uploads the image information is contained in the uploaded image information. In addition, for example, the imaged person information may be entered by the user from the terminal device 101.

The first updater 115 generates the first SNS data 117 that is the obtained image information associated with the obtained comment information, imaging location information, and album name information, and stores the generated data in the first SNS memory 114. In addition, when the imaged person information is obtained, the first updater 115 generates the first SNS data 117 further associated with the imaged person information, and stores the generated information in the first SNS memory 114. The first updater 115 allocates and associates the above entries that are posting ID and image ID with various information.

The first viewing processor 116 obtains, when obtaining a request based on the user input from the terminal device 101 via the network 106, the first SNS data 117 that matches the request from the first SNS memory 114, and transmits the obtained first SNS data 117 to the terminal device 101. Hence, the terminal device 101 displays the image on the display 111 based on the information contained in the first SNS data 117.

Figure 5:
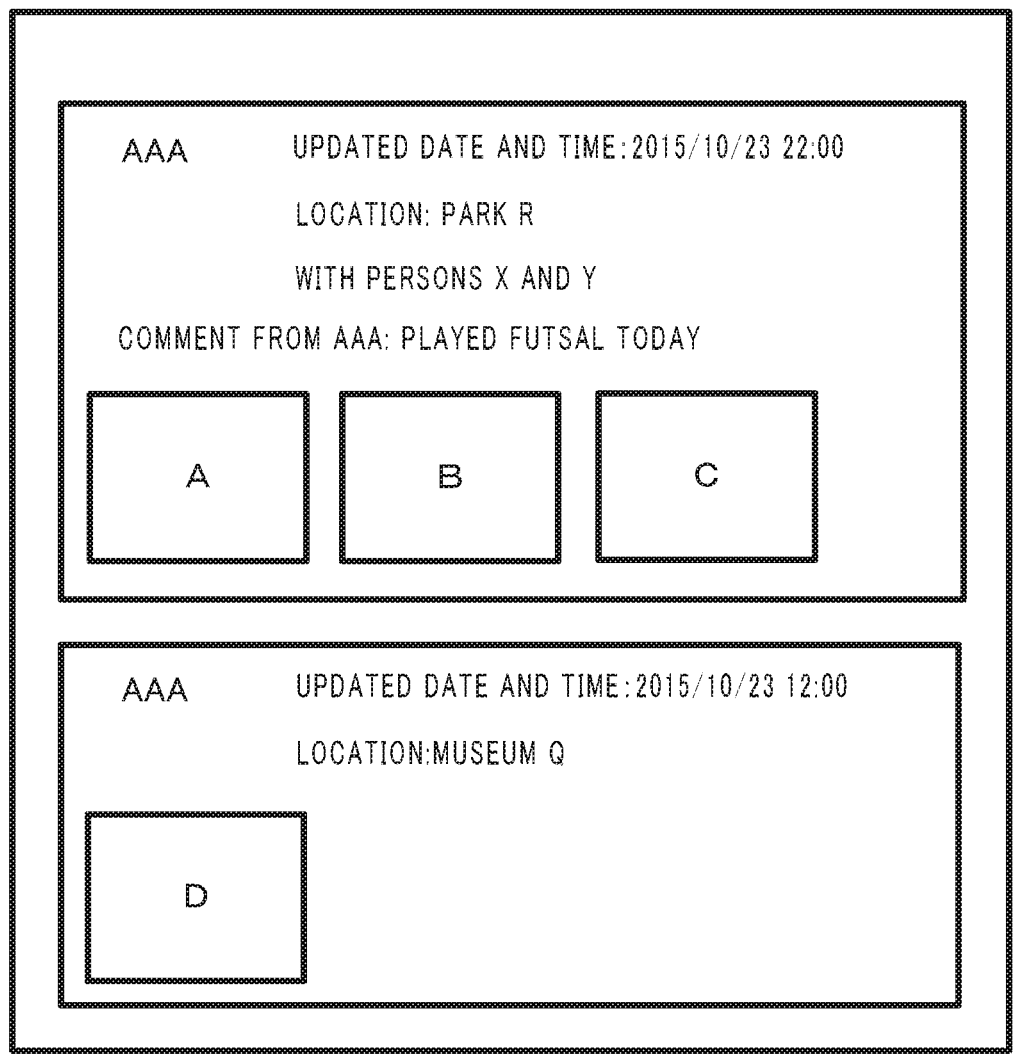
FIG. 5 is a diagram illustrating an example structure of an image displayed on the terminal device based on transmitted information from the first SNS server.

When, for example, there is a request (viewing request) to view information contained in the first SNS data 117 stored in the first SNS memory 114, as illustrated in FIG. 5, the terminal device 101 displays, on the display 111, the image in which a plurality of information are arranged. Note that as illustrated in the figure, the newer the posted date and time is, the upper location the information is displayed on the display 111.

Figures 6, 7:
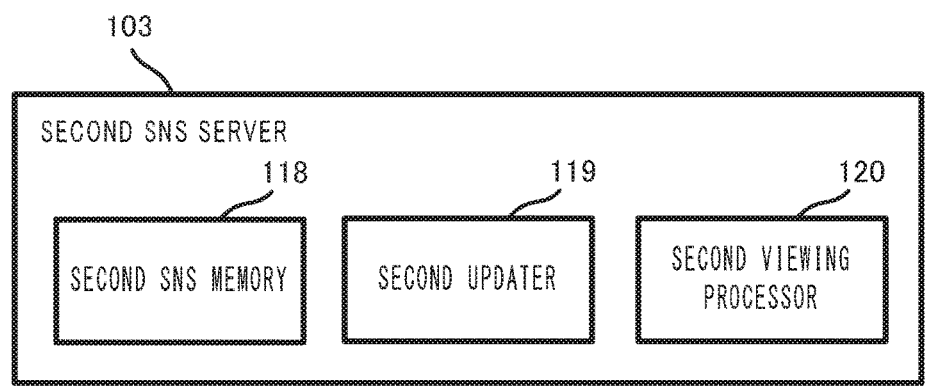
FIG. 6 is a diagram illustrating a functional structure of a second SNS server according to an embodiment.
FIG. 7 is a diagram illustrating example second SNS data.

As illustrated in FIG. 6, the second SNS server 103 includes functional structures that are a second SNS memory 118, a second updater 119, and a second viewing processor 120 that have the similar functions as those of the first SNS memory 114, the first updater 115, and the first viewing processor 116, respectively, in the first SNS server 102.

The second SNS memory 118 stores second SNS data 121 that contains various information like the image information uploaded by the user from the terminal device 101. The second SNS memory 118 includes, like the first SNS memory 114, a flash memory, a Hard Disk Drive (HDD), or the like.

As illustrated in FIG. 7, the second SNS data 121 according to this embodiment is data that includes a plurality of information (entries) "posting ID", "user", "posted date and time", "comment", "image ID", and "image" associated with each other. Each entry "posting ID", "user", "posted date and time", "comment", "image ID", and "image" is substantially equivalent to those of the first SNS data 117 explained above with the "first SNS data 117", the "first SNS server 102", and the "first updater 115" being replaced with the "second SNS data 121", the "second SNS server 103", and the "second updater 119", respectively. In the example illustrated in FIG. 7, the entry "image" which is "E", "F", and "G" and which are the plurality of image information collectively received are associated with one entry "posting ID" contained in the second SNS data 121. As illustrated in the figure, the second SNS data 121 differs from the first SNS data 117 such that information corresponding to the entries "imaging location", "imaged person", and "album name" are not contained. That is, the first SNS server 102 has a different function from that of the second SNS server 103 such that the information corresponding to the entries "imaging location", "imaged person", and "album name" are managed.

Figure 8:
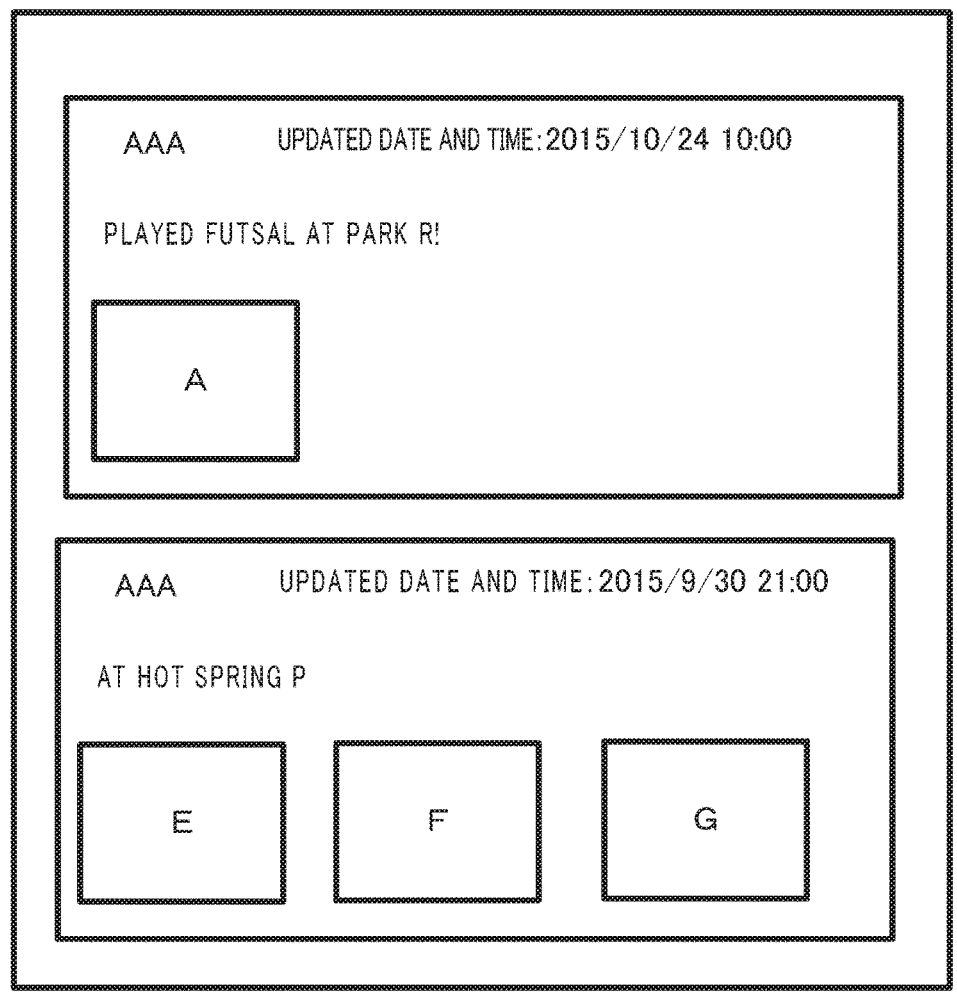
FIG. 8 is a diagram illustrating an example structure of an image displayed on the terminal device based on transmitted information from the second SNS server.

With reference to FIG. 6, the second updater 119 and the second viewing processor 120 are substantially equivalent to the first updater 115 and the first viewing processor 116 explained above with the "first updater 115", the "first viewing processor 116", the "first SNS data 117", and the "first SNS memory 114" being replaced with the "second updater 119", the "second viewing processor 120", the "second SNS data 121", and the "second SNS memory 118", respectively. FIG. 8 illustrates an example case in which the plurality of information in the second SNS data 121 are displayed on the display 111 of the terminal device 101.

Figures 9, 10:
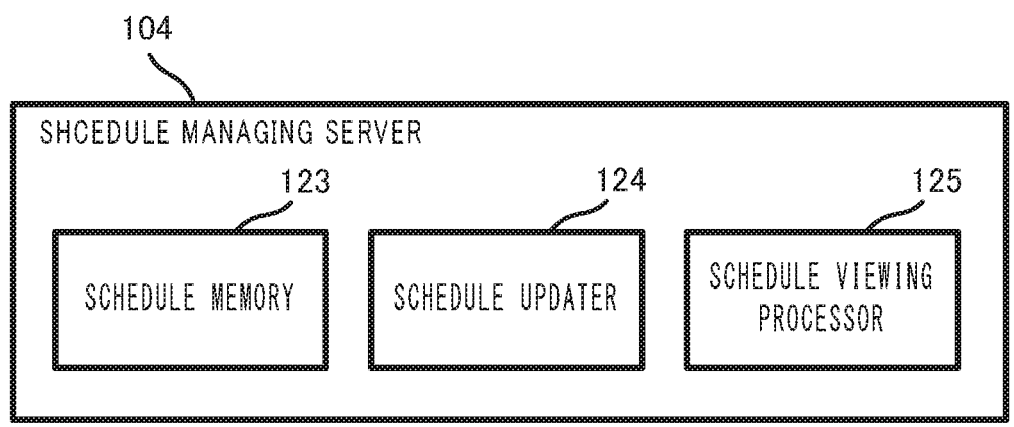
FIG. 9 is a diagram illustrating a functional structure of a schedule managing server according to an embodiment.
FIG. 10 is a diagram illustrating example schedule data.

The schedule managing server 104 illustrated in FIG. 1 manages schedule data 122 (see FIG. 10) uploaded by the user from the terminal device 101 or the like. As illustrated in FIG. 9 the schedule managing server 104 includes functional structures that are a schedule memory 123, a schedule updater 124, and a schedule viewing processor 125. The schedule managing server 104 is accomplished by a general-purpose computer in which a software to provide a schedule managing function to the user is installed.

The schedule memory 123 stores the schedule data 122 indicating the schedule of the user. For example, the schedule memory 123 is a flash memory or an HDD.

As illustrated in FIG. 10 that is an example case for a user "AAA", the schedule data 122 according to this embodiment includes entries "date and time", "details", "location", and "member" associated with each other. The plurality of information contained in the schedule data 122 are entered beforehand via the terminal device 101.

The entry "date and time" is information on the date and time at which the user has a plan. The entry "details" is information indicating the details of the user's plan. The entry "location" is information indicating the location where the plan is held or the location planned to visit. The entry "member" indicates a person who has the plan together with the user.

For example, one of the schedule data 122 illustrated in FIG. 10 indicates a plan of a hot spring trip to a hot spring P together with a person X from Sep. 29, 2015 to Sep. 30, 2015. In addition, the other one of the schedule data 122 illustrated in FIG. 10 indicates a plan of a futsal to a park R together with persons X and Y from Oct. 23, 2015, 20:00 to Oct. 23, 2015, 21:00.

The schedule updater 124 stores, when obtaining the schedule data 122 from the terminal device 101 operated by the user via the network 106, the obtained schedule data 122 in the schedule memory 123.

The schedule viewing processor 125 obtains, when obtaining a request from the information managing device 105 or a request from the terminal device 101 entered by the user via the network 106, the matching schedule data to the request from the schedule memory 123, and transmits the obtained schedule data 122 to the information managing device 105 or the terminal device 101 that has made the request. A request from the terminal device 101 controls the display 111 to display the plan indicated by the schedule data 122 on the screen, enabling the user to check the plan.

Figure 11:
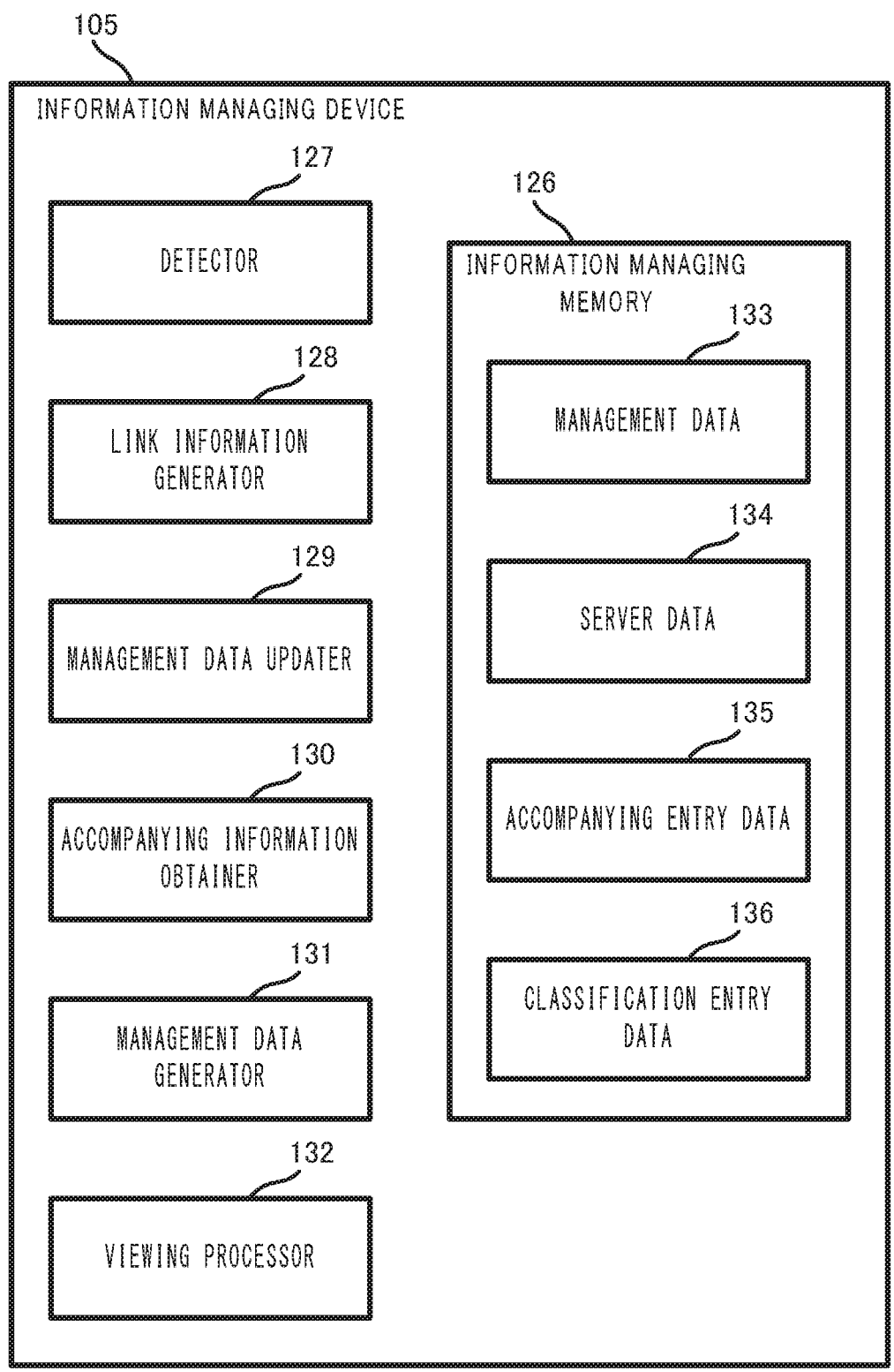
FIG. 11 is a diagram illustrating a functional structure of an information managing device according to an embodiment.

The information managing device 105 illustrated in FIG. 1 collectively manages the uploaded image information by the user to the first SNS server 102 and the second SNS server 103. As illustrated in FIG. 11, the information managing device 105 includes an information managing memory 126, a detector 127, a link information generator 128, a management data updater 129, an accompanying information obtainer 130, a management data generator 131, and a viewing processor 132. The information managing device 105 is accomplished by a general-purpose computer in which a software program to provide functions to be explained later to the user is installed.

The information managing memory 126 includes, as a physical structure, a flash memory or an HDD, and stores management data 133, server data 134, accompanying entry data 135, and classification entry data 136.

The management data 133 includes, at least the image information that is the target management information and link information associated with each other. In this case, the link information is to access the associated image information via the network 106.

As illustrated in FIG. 12, the management data 133 according to this embodiment includes entries "management ID", "link", "posted date and time", "imaging location", "imaged person", "album name", "sub link", and "sub posted date and time" associated with each other.

The "management ID" is to identify each management data 133, and in this embodiment, a sequential number in accordance with the updated sequence is adopted. In this embodiment, a single management ID is allocated to each image information that is the target management information.

The entries "link" and "sub link" are information on links. As illustrated in FIG. 12, the link information according to this embodiment is indicated so as to include the address of the SNS server 102, 103 storing the image information over the network 106, and the image ID in such an SNS server 102, 103 interconnected with each other by a symbol "_". That is, in this embodiment, the image information that is the target management information is identifiable based on the address of the SNS server and the image ID (image address) that is information to identify the image in such an SNS server.

In the case of the image information stored in either the first SNS server 102 or the second SNS server 103 only, the entry "link" in the management data 133 is set to be the information containing the address of the SNS server storing the image information in the SNS servers 102, 103, and the image ID. In this case, no information is set for the entry "sub link" in the management data 133.

In the case of the image information stored in both the first SNS server 102 and the second SNS server 103, the entry "link" in the management data 133 is set to be the link information containing the address of the first-prioritized SNS server in the SNS servers 102, 103, and the "image ID". In this case, the entry "sub link" in the management data 133 is set to be the link information containing the address of the second-prioritized SNS server in the SNS servers 102, 103, and the "image ID".

The prioritized order in this case may be set beforehand. In this embodiment, an explanation will be given of an example case in which the first SNS server 102 has a higher prioritized order than that of the second SNS server 103.

The entries "posted date and time" and "sub posted date and time" indicate the date and time at which the image information is uploaded, and the details of the "posted date and time" in the first SNS data 117 and in the second SNS data 121 is set to those entries.

In the case of the image information stored in either the first SNS server 102 or the second SNS server 103 only, the entry "posted date and time" in the management data 133 is set to be the details of the "posted date and time" of the SNS data stored in the SNS server that stores the image information in the SNS servers 102, 103. In this case, no information is set for the entry "sub posted date and time" in the management data 133.

In the case of the image information stored in both the first SNS server 102 and the second SNS server 103, the entry "posted date and time" in the management data 133 is set to be the details of the "posted date and time" in the SNS data stored in the first-prioritized SNS server in the SNS servers 102, 103. In this case, the entry "sub posted date and time" in the management data 133 is set to be the details of the "posted date and time" in the SNS data stored in the second-prioritized SNS server in the SNS servers 102, 103.

The "imaging location" is information indicating the imaging location of the image indicated by the image information that is the target management information.

In this embodiment, the details of "imaging location" in the SNS data 117, 121, stored in the SNS server 102, 103 set as "link" is set for the entry "imaging location". When the entry "imaging location" of the SNS data 117, 121 stored in the SNS server 102, 103 set as the "link" contains no information, the entry "imaging location" in the management data 133 is set to be the details of "imaging information" in the SNS data 117, 121 stored in the SNS server 102, 103 set as "sub link". In addition, when the entry "imaging location" of the SNS data 117, 121 stored in the SNS server 102, 103 set as the "sub link" also contains no information, the entry "imaging location" in the management data 133 is set based on the "location" contained in the schedule data 122.

The entry "imaged person" indicates, when the image indicated by the image information that is the target management information contains a person, such a person.

In this embodiment, when the first SNS server 102 is set as "link", and the entry "imaged person" in the first SNS data 117 contains any information, the entry "imaged person" in the management data 133 is set to be the details of the entry "imaged person" in the first SNS data 117. When the second SNS server 103 is set as "link" or when the first SNS server 102 is set as "link" and the entry "imaged person" in the first SNS data 117 contains no information, the entry "imaged person" in the management data 133 is set to be the details of the entry "member" contained in the schedule data 122.

The entry "album name" indicates a name given to identify each group when the plurality of information are managed group by group.

In this embodiment, when the first SNS server 102 is set as "link", and the entry "album name" in the first SNS data 117 contains any information, the entry "album name" in the management data 133 is set to be the details of the entry "album name" in the first SNS data 117. When the first SNS server 102 is set as "link", and the entry "album name" in the first SNS data 117 contains no information, the entry "album name" in the management data 133 is set to be a part of the entry "comment" in the first SNS data 117 like the first 20 characters of the "comment". The entry "album name" may be entered and set by the user via the terminal device 101.

Figure 13:
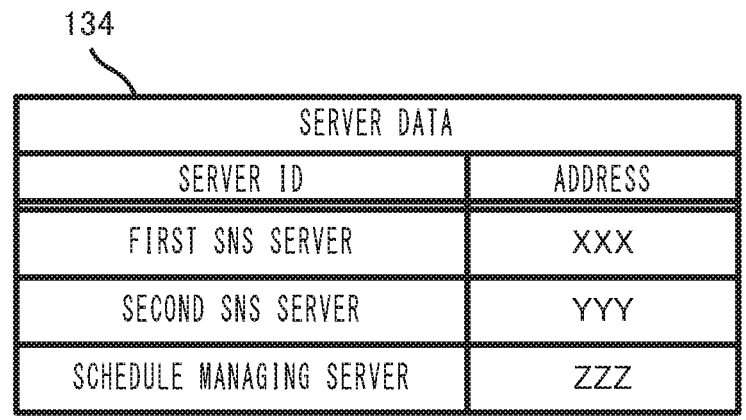
FIG. 13 is a diagram illustrating example server data.

Returning to FIG. 11, the server data 134 indicates the address of each server 102-104 over the network 106. In this embodiment, as illustrated in FIG. 13, the server data 134 includes the entry "server ID" to identify each server 102-104, and the entry "address" indicating the address of the server 102-104 over the network 106 associated with each other. The entry "server ID" may be set as appropriate by the user.

Figure 14:
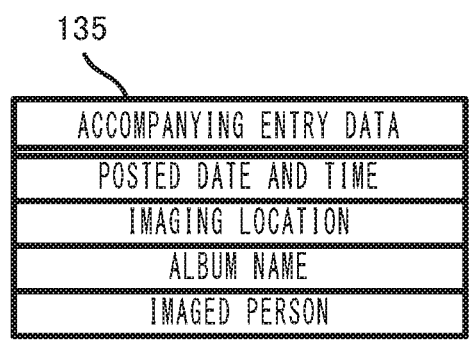
FIG. 14 is a diagram illustrating example accompanying entry data.

The accompanying entry data 135 illustrated in FIG. 11 defines the type of the accompanying data to be managed as information accompanying to the image information that is the target management information. In this embodiment, as illustrated in FIG. 14, types (accompanying entries) "posted date and time", "imaging location", "album name", and "imaged person" are set for the accompanying information.

Figure 15:
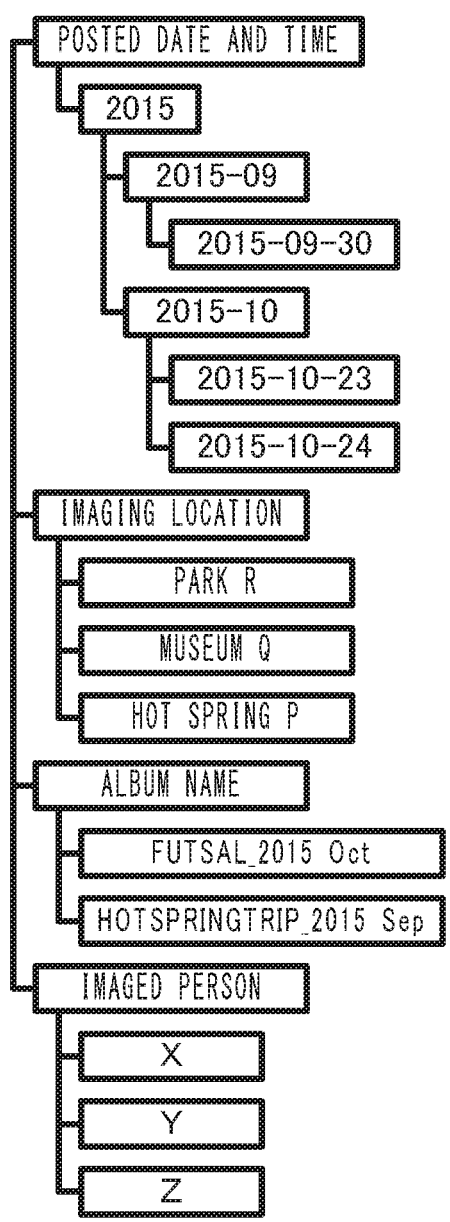
FIG. 15 is a diagram illustrating an example tree structure to classify image information based on accompanying information.

The classification entry data 136 illustrated in FIG. 11 indicates the grouping structure to classify (grouping) the image information that is the target management information and to control the display 111 to display the classified image information. In this embodiment, as illustrated in FIG. 15, the details of the accompanying entry are classified into groups gradually subdivided and represented by a tree structure for each accompanying entry set for the accompanying entry data 135, and the image information having undergone the classification is displayed. In order to define the tree structure in FIG. 15, for example, as illustrated in FIG. 16, the classification entry data 136 includes entries "classification entry ID", "classification entry name", and "parent classification entry" associated with each other. More specifically, according to this embodiment, the accompanying entry data 136 illustrated in FIG. 16 is read, and in accordance with subdivision setting information set beforehand, the accompanying entry is subdivided into multiple classifications. The subdivision setting information indicates how many layers each accompanying entry is subdivided, and may be defined beforehand. In the case of, for example, the posted date and time, such an entry is subdivided into layers like "year" "year and month", and "year, month, and day". The details of the subdivision setting information on how many layers the entry is subdivided may be set up by the user. When, in particular, the subdivision is performed on the imaging location based on an address like "country", "state", "city", there may be unnecessary layers for the user. Hence, by omitting, for example, the layer "country", the presence of unnecessary layer is avoidable. In addition, the subdivision setting information may include several patterns prepared beforehand, and such patterns may be selected in accordance with the user's interest. As for the imaging location, for example, various patterns may be prepared such as a pattern for the subdivision based on the address, and a pattern for the subdivision based on the facility, such as "restaurant", "entertainment park", and "hot spring".

The entry "classification entry ID" is to identify each classification entry, and in the example case illustrated in FIG. 16, is a number given as appropriate. The entry "classification entry name" indicates the name given to the group. The entry "parent classification entry" indicates the name of the classification entry located right above in the tree structure. In this embodiment, in accordance with the subdivision setting information, the details of the accompanying entry are subdivided through the process to be explained later for each accompanying entry set for the accompanying data 135.

Returning to FIG. 11, the detector 127 detects the uploaded image information to the first SNS server 102 and the second SNS server 103. The detector 127 according to this embodiment detects, when new image information is uploaded to each of the first SNS server 102 and the second SNS server 103, such new image information.

The link information generator 128 generates the link information to access the detected image information by the detector 127.

The management data updater 129 determines whether or not there is the management data 133 on the image information consistent with the detected image information by the detector 127. When determining that there is the management data 133 on the same image information, the management data updater 129 stores the link information generated by the link information generator 128 and the corresponding "posted date and time" in the entries "sub link" and "sub posted date and time", respectively, in the management data 133. When determining that there is the management data on the same image information, the management data updater 129 may set the link information on the image information with a high resolution to the entry "link", and may set the link information on the image information with a low resolution to the entry "sub link".

The accompanying information obtainer 130 obtains the accompanying information corresponding to the accompanying entry contained in the accompanying entry data 135, and updates the management data 133. In addition, the accompanying information obtainer 130 updates the classification entry data 136 based on the obtained accompanying information and the pre-set subdivision setting information.

Figure 17:
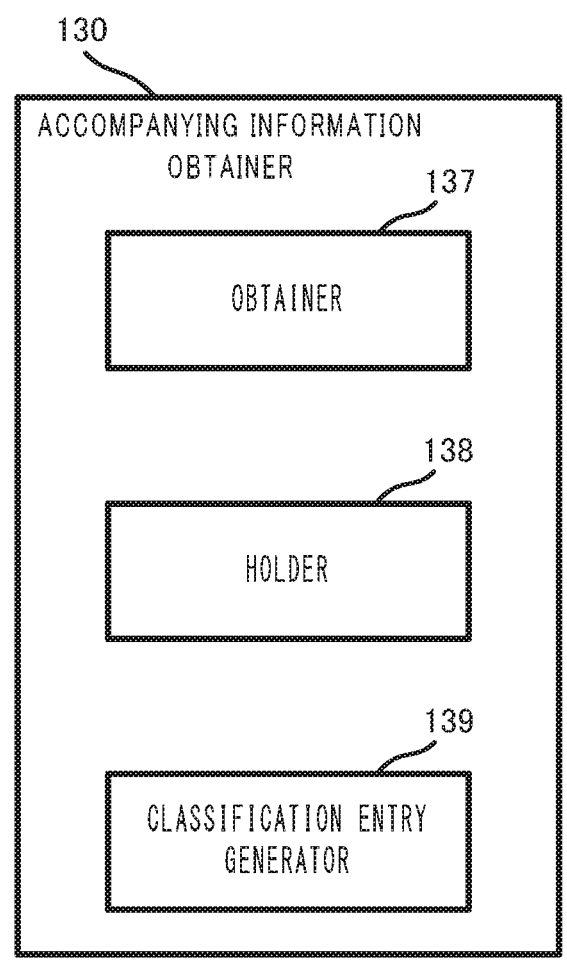
FIG. 17 is a diagram illustrating a detailed structure of an accompanying information obtainer.

More specifically, the accompanying information obtainer 130 includes, as illustrated in FIG. 17, an obtainer 137, a holder 138, and a classification entry generator 139.

The obtainer 137 refers to the accompanying entry data 135, and obtains the accompanying information in sequence for each type of the accompanying information contained in the accompanying entry data 135.

The accompanying information may be obtained from any of the first SNS server 102, the second SNS server 103, and the schedule managing server 104. In addition, the accompanying information may be obtained from the terminal device 101 based on a user input.

The holder 138 holds the obtained accompanying information by the obtainer 137.

The classification entry generator 139 adds, when the classification entry of the "classification entry name" specified based on the accompanying information obtained by the obtainer 137 and the subdivision setting information is not contained in the classification entry data 136, the information corresponding to the classification entry of the "classification entry name", thereby updating (that is, subdividing and newly adding information) the classification entry data 136. The classification entry generator 139 stores the generated classification entry data 136 in the information managing memory (see FIG. 11) 126.

Returning to FIG. 11, the management data generator 131 generates the management data 133 that contains the generated link information by the link information generator 128, and the held accompanying information by the holder 138. The management data generator 131 stores the generated management data 133 in the information managing memory 126.

The viewing processor 132 executes a process of classifying the image information contained in the management data 133 in the tree structure indicated by the classification entry data 136 in accordance with, for example, a request from the terminal device 101, and controlling the terminal device 101 to display the classified data on the display 111.

The explanation has been given of the structure of the information management system 100 according to an embodiment of the present disclosure up to this paragraph. Next, an explanation will be given of an action of the information management system 100.

Figure 18:
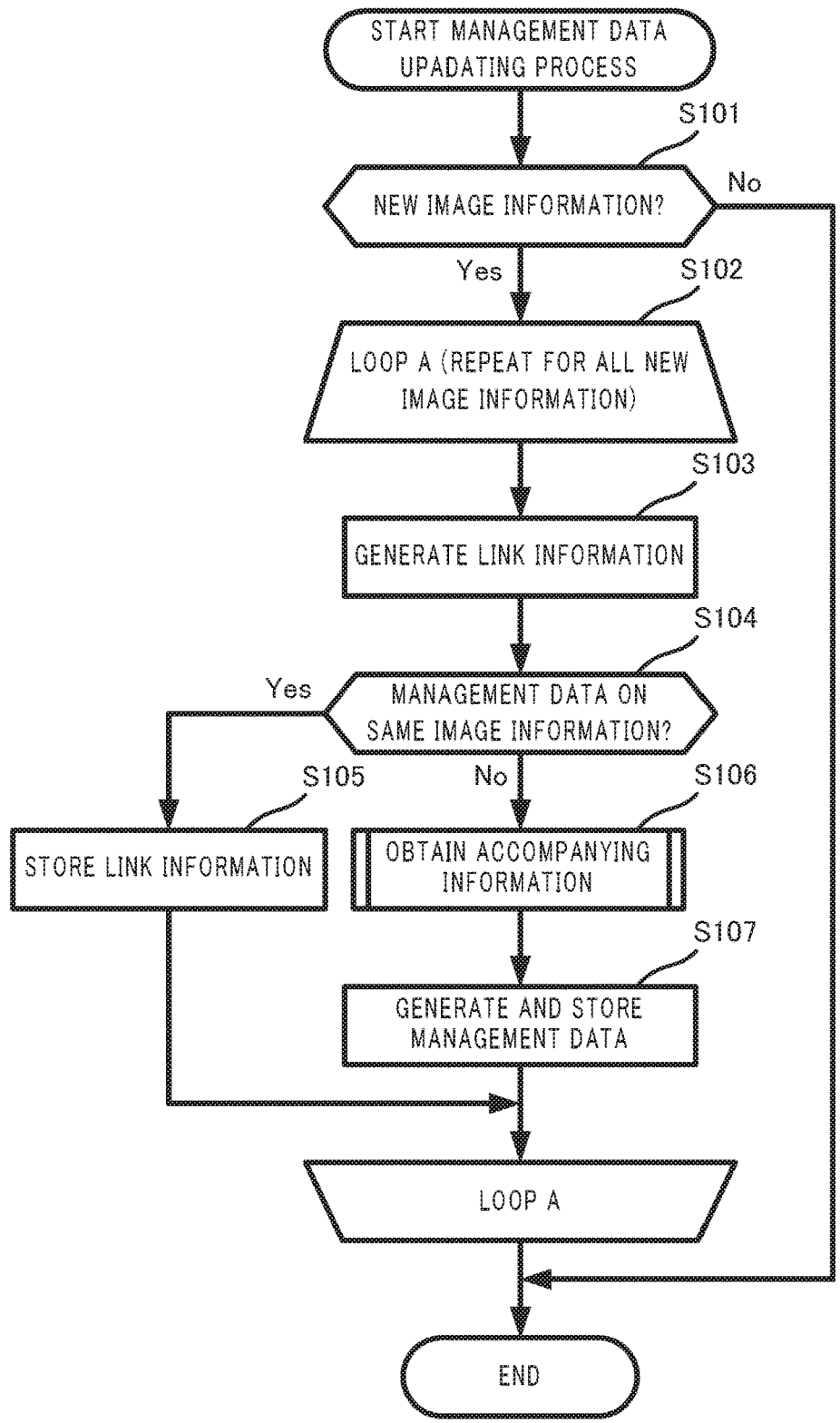
FIG. 18 is a flowchart illustrating a flow of a management data updating process according to an embodiment.

As illustrated in FIG. 18, the information managing device 105 executes a management data updating process of updating the management data 133 in accordance with the upload of the image information to the first SNS server 102 and the second SNS server 103. For example, the management data updating process may be executed at a constant cycle.

The detector 127 determines whether or not there is new image information (step S101).

More specifically, for example, the detector 127 refers to the server data 134 and the management data 133, and accesses the first SNS server 102 and the second SNS server 103, thereby determining whether or not the image information not specified by the "link" and "sub link" in the management data 133 has been uploaded to the first SNS server 102 and the second SNS server 103.

Next, when the image information not specified by the "link" and "sub link" in the management data 133 has been uploaded, the detector 127 determines that there is the new image information. When the image information not specified by the "link" and "sub link" in the management data 133 has not been uploaded, the detector 127 determines that there is no new image information.

When determining that there is no new image information (step S101: NO), the detector 127 ends the management data updating process.

When the detector 127 determines that there is new image information (step S101: YES), the information managing device 105 repeatedly executes the processes in the steps S103-S107 for all new image information detected in the step S101 (loop A: step S102).

The link information generator 128 generates the link information on the detected image information in the step S101 (step S103).

More specifically, the link information generator 128 refers to the server data 134 to obtain the addresses of the SNS server 102, 103 soring the detected image information in the step S101. In addition, the link information generator 128 obtains the corresponding "image ID" to the image information in the SNS data 117, 121 of the SNS server 102, 103 storing the detected image information in the step S101. The link information generator 128 generates the link information based on the obtained address and the entry "image ID".

The management data updater 129 determines whether or not there is the management data 133 on the image information consistent with the detected image information in the step S101 (step S104).

More specifically, for example, the management data updater 129 determines whether or not there is the management data 133 on the image information consistent with the detected image information in the step S101 based on whether or not the same image information as the detected image information in the step S101 has been already uploaded to the SNS server 102, 103 different from the SNS server 102, 103 includes the image information detected in the step S101.

When determining that there is the management data 133 on the same image information (step S104: YES), the management data updater 129 stores the generated link information in the step S103 and the corresponding "posted date and time" in the "sub link" of the management data 133 and the "sub posted date and time" thereof, respectively (step S105).

When the management data updater 129 determines that there is no management data 133 on the same image information (step S104: NO), the accompanying information obtainer 130 executes the accompanying information obtaining process of obtaining the accompanying information (step S106).

Figure 19:
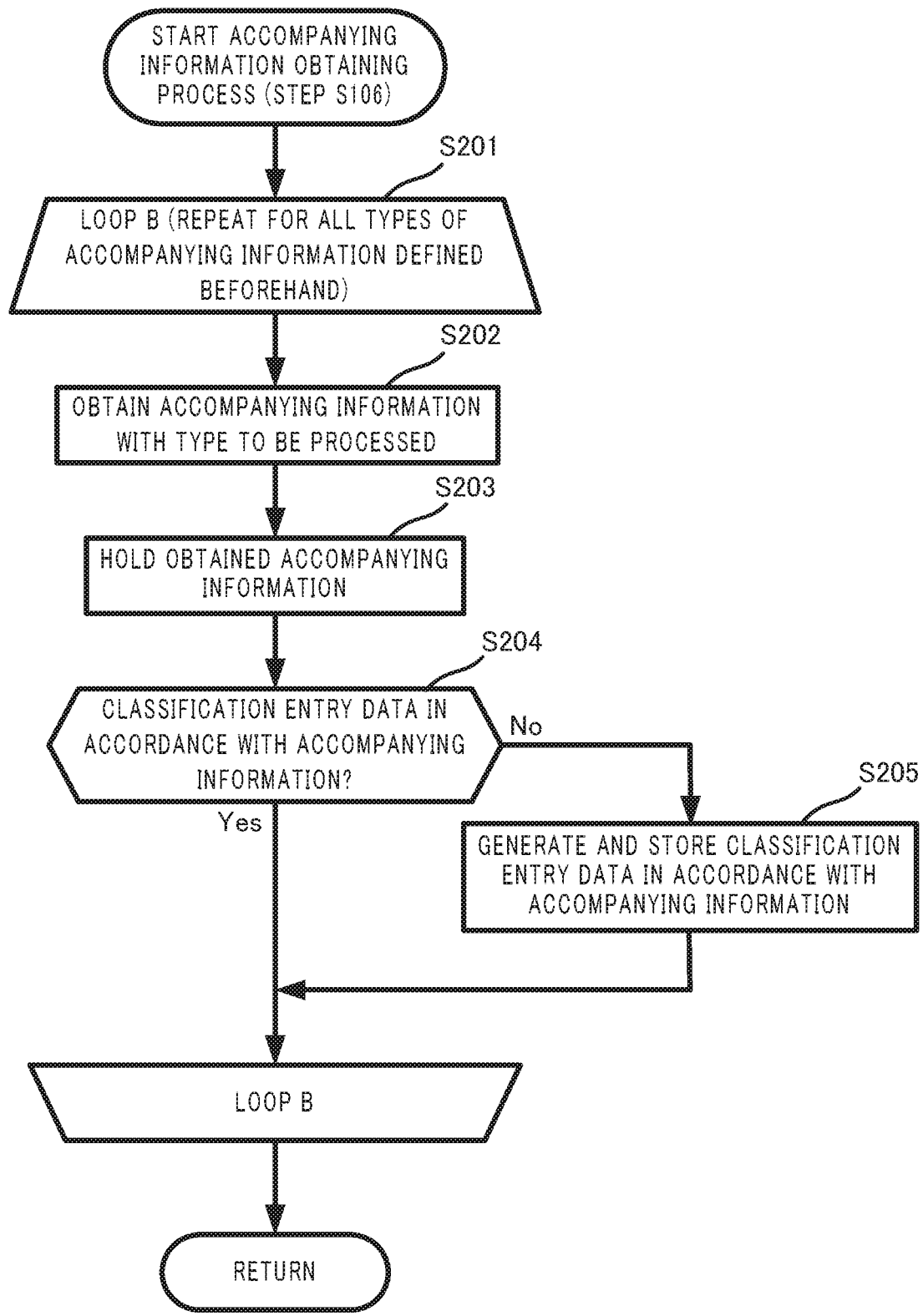
FIG. 19 is a flowchart illustrating a detailed flow of an accompanying information obtaining process illustrated in FIG. 18.

As illustrated in FIG. 19 that shows the flow of the accompanying information obtaining process (step S106), the accompanying information obtainer 130 repeats processes in steps S202-S205 for all accompanying entries (types of accompanying information) defined beforehand for the accompanying entry data 135 (loop B: step S201).

In this embodiment, the accompanying information obtainer 130 repeats processes in the steps S202-S205 for each of the entries "posted date and time", "imaging location", "album name", and "imaged person".

The obtainer 137 obtains the accompanying information with the type subjected to the process (step S202).

More specifically, for example, the obtainer 137 refers to the server data 134, and accesses the first SNS server 102, the second SNS server 103, and the schedule managing server 104 in this sequence defined beforehand until the accompanying information with the type subjected to the process is obtained.

When, for example, image information "D" is detected in the step S101 in FIG. 18, and when the type of the accompanying information subjected to the process is the entry "imaged person", the obtainer 137 refers to the first SNS data 117 in the first SNS server 102. As illustrated in FIG. 4, the first SNS data 117 contains no information set in the entry "imaging person".

Hence, next, the obtainer 137 refers to the second SNS data 121 in the second SNS server 103. As illustrated in FIG. 7, since the second SNS data 121 contains no image information "D", the "imaged person" corresponding thereto is also not contained.

Hence, still further, the obtainer 137 refers to the schedule data 122 in the schedule managing server 104. As illustrated in FIG. 10, the schedule data 122 contains data that includes the entry "imaging location" which is a museum Q associated with the image information "D" in the first SNS data 117. The obtainer 137 obtains the person Z set in the entry "member" associated with the museum Q in the schedule data 122 as the entry "imaged person" accompanying to the image information "D". In addition to this action, the obtainer 137 may compare the imaging date and time in the image information with the schedule data 122 in the schedule managing server 104, and may obtain the entry "imaged person" corresponding to the date and time indicated by the imaging date and time information from the schedule data 122. More specifically, when the imaging date and time information contained in the image information "D" is Oct. 23, 2015, 10:30, by referring to the corresponding entry in the schedule data 122 stored in the schedule managing server 104, the person "Z" is obtainable as the entry "imaged person". Note that all accompanying entries other than the entry "imaged person" may be obtained upon comparison between the imaging date and time contained in the image information with the schedule data 122 in the schedule managing server 104.

In addition, the explanation has been given of an example case in which the obtainer 137 refers to the first SNS server 102, the second SNS server 103, and the schedule managing server 104 in this sequence to obtain the accompanying information, but a prioritization may be set beforehand for each accompanying information, and those servers may be referred at a different sequence in accordance with the type of the accompanying information. Still further, reference may be made to the first SNS server 102, the second SNS server 103, and the schedule managing server 104 in this sequence, and the process may be ended as the obtainment of the accompanying information being completed at a time point at which this accompanying information is obtained, and the process may be transitioned for the next accompanying information. In addition, reference may be made to all servers, and when there is accompanying information that includes different details, the accompanying information whose number of matching details is the largest may be adopted, the accompanying information that has a high prioritization defined beforehand may be adopted, or the accompanying information selected by the user may be adopted.

When the accompanying information is not obtainable from any of the first SNS server 102, the second SNS server 103, and the schedule managing server 104, the accompanying information may be obtained from the terminal device 101 based on the user input. When the accompanying information is obtained from the terminal device 101 based on the user input, even if the accompanying information is obtained from any of the first SNS server 102, the second SNS server 103, and the schedule managing server 104, the accompanying information obtained from the terminal device 101 may be preferentially adopted.

The holder 138 holds the accompanying information obtained in the step S202 (step S203).

The classification entry generator 139 determines whether or not there is the classification entry in accordance with the held accompanying information in the step S203 and the subdivision setting information by referring to the classification entry data 136 (step S204).

When determining that there is no classification entry data 136 (step S204: NO), the classification entry generator 139 generates the classification entry in accordance with the held accompanying information in the step S203 and the subdivision setting information, and stores the classification entry data 136 in the information managing memory 126 (step S205).

When having repeated the processes in the steps S202-S205 on the accompanying entry data 135 for all types of accompanying information defined beforehand (loop B: step S201), the accompanying information obtainer 130 ends the accompanying information obtaining process (step S106).

Returning to the management data updating process in FIG. 18, the management data generator 131 generates the management data 133 that includes the generated link information in the step S103 associated with each accompanying information obtained by repeatedly executing the step S106, and stores the generated data in the information managing memory 126 (step S107).

The information managing device 105 repeatedly executes (loop A: step S102) the processes in the steps S103-S107 for all new image information detected in the step S101, and ends the management data updating process.

Figure 20:
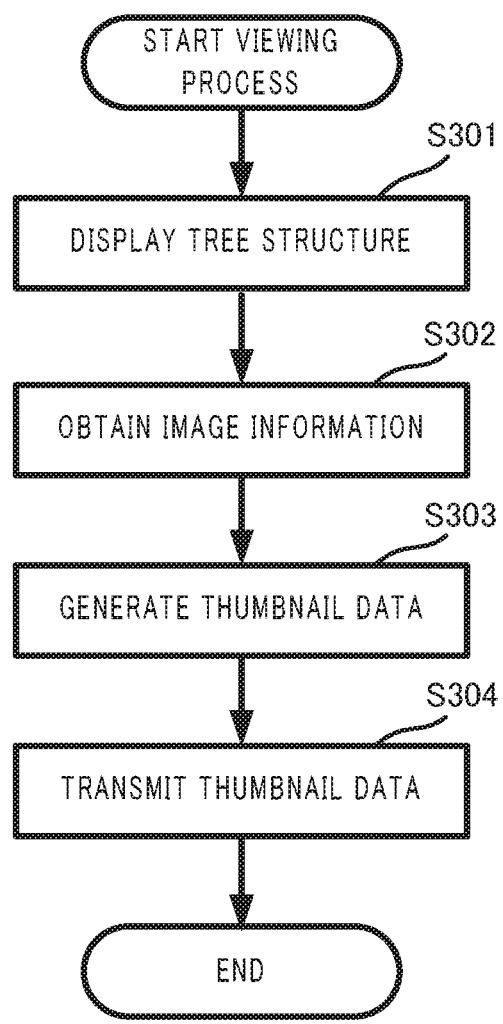
FIG. 20 is a flowchart illustrating a flow of a viewing process according to an embodiment.

In addition, as illustrated in FIG. 20, the information managing device 105 executes the viewing process for allowing the user to view the managed image information by the information managing device 105. The viewing process is executed upon, for example, receiving a request from the terminal device 101, and this request is transmitted from the terminal device 101 when, for example, the user utilizes the terminal device 101 and logs in the information managing device 105.

The viewing processor 132 obtains the classification entry data 136, generates the three structure as illustrated in FIG. 15 based on the obtained classification entry data 136, and displays the tree structure on the display 111 of the terminal device 101 (step S301).

The viewing processor 132 obtains the image information from the first SNS server 102 and the second SNS server 103 based on the link information in the management data 133, and identifies to which classification entry the obtained image information belongs based on the classification entry data 136 and the accompanying information of the management data 133 (step S302). More specifically, the viewing processor 132 refers to the management data 133, and identifies to which accompanying information the obtained image information belongs. Next, the viewing processor 132 identifies to which classification entry among the identified accompanying information the obtained image information belongs by referring to the classification entry data 136, thereby associating the image information with the classification entry.

The viewing processor 132 generates thumbnail data indicating the scaled-down image that is the link information enabling an access to the image information by reducing the size of the obtained image information in the step S302 to a predetermined size (step S303). The thumbnail data contains the link information to access the image information, and as explained later, the uploaded image information is accessible based on the thumbnail data.

Figure 21:
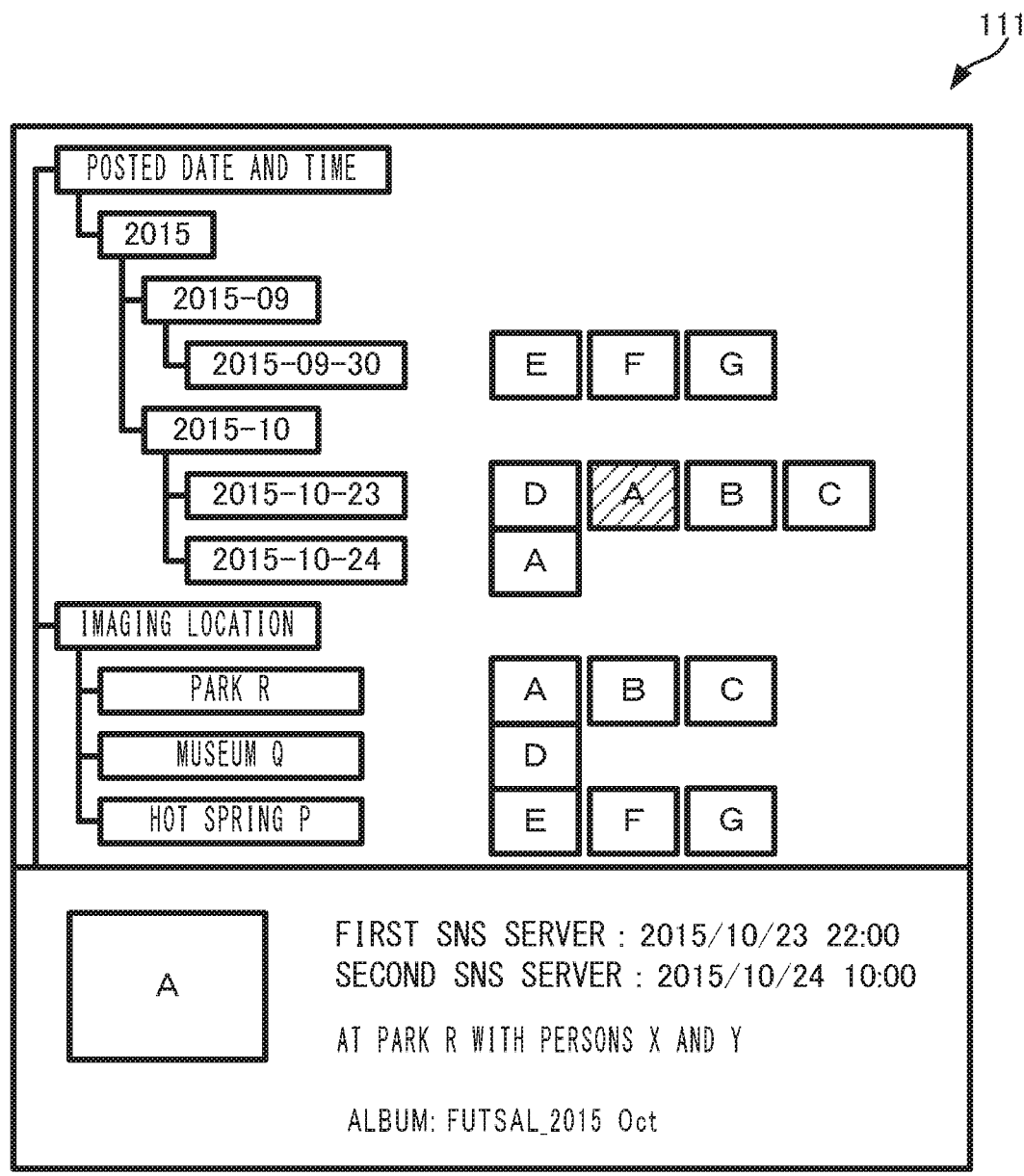
FIG. 21 is a diagram illustrating an example structure of an image on the terminal device which displays image information managed by the information managing device.

Subsequently, the viewing processor 132 transmits, to the terminal device 101, the details of the classification entry associated with the image information in the step S302 together with the thumbnail data generated in the step S303, and as illustrated in FIG. 21, the details of the classification entry are displayed in association with the thumbnail data (step S304).

By executing such a viewing process, as illustrated in, for example, FIG. 21, the uploaded image to the first SNS server 102 and the second SNS server 103 can be displayed on the display 111 of the terminal device 101 in a manner classified by the tree structure. In addition, since the thumbnail is adopted as the information to identify each image, the user can easily recognize the image by simply viewing. In this embodiment, the explanation has been given of an example case in which the thumbnail data containing the link information is displayed, but for example, the accompanying information containing the link information like the album name may be displayed.

In FIG. 21, the screen is divided into the upper part and the lower part, the thumbnails classified by the tree structure are displayed on the upper part, while the large image of the selected thumbnail (in the illustrated example, the selected thumbnail is "A" classified in "2015-10-23") together with the accompanying information of the image are displayed on the lower part. More specifically, when a thumbnail is selected by the user, the viewing processor 132 enlarges the selected thumbnail and displays on the lower part of the screen, and also displays the accompanying information in the management data 133. In addition, as explained above, since the thumbnail data contains the link information to access the image information, by selecting the displayed large image, an access can be made to the image information actually uploaded to the first SNS server 102 and the second SNS server 103.

As explained above, according to this embodiment, the image information is managed based on the management data 133 that contains the link information to access the image information via the network 106. Hence, the image information itself does not need to be contained in the management data 133. Accordingly, the uploaded image information to the multiple SNS servers 102, 103 can be managed at a little data quantity.

In addition, according to this embodiment, the thumbnail of the image information is classified by the tree structure in accordance with the details of the classification entry, and is displayed. Hence, the user is capable of checking what image information has been uploaded to the multiple SNS servers 102, 103 in a classified (grouped) manner. This facilitates the user to check the image information uploaded to the multiple SNS servers 102, 103. That is, the user who utilizes the multiple SNSs is enabled to grasp what image information has been posted and on what SNS such information has been posted at a glance, enabling an easy management of the image information.

The present disclosure can be carried out in various embodiments and modified forms thereof without departing from the broadest scope and spirit of the present disclosure. In addition, the above embodiment is merely to explain the present disclosure, and is not intended to limit the scope of the present disclosure. That is, the scope of the present disclosure is indicated by the appended claims rather than the embodiment. Various modifications made within the scope of the appended claims and the equivalent ranges thereof are also within the scope of the present disclosure.

In the above embodiment, the explanation has been given of an example case in which, when the management data 133 and the classification entry data 136 are generated and displayed, as illustrated in FIG. 21, the classification and the thumbnail are displayed in association with each other, but this is merely an example. For example, the link information and the classification entry corresponding to the image information may be stored in association with each other, and the stored details may be simply displayed at the time of display action. More specifically, a folder may be generated for each classification entry, and the link information may be stored in the corresponding folder to the classification entry through the process in the step S107 in FIG. 18.

In the above embodiment, although the explanation has been given of an example case in which the image information is managed, the target management information is not limited to the image information, and for example, comment information may be managed. More specifically, a determination on whether or not there is new comment information may be made in the step S101 in FIG. 18, and the link information corresponding to such new comment information may be generated in the step S103. Next, a part of the comment may be associated with the classification entry and displayed through the process in the step S304 in FIG. 20.

Programs and data to accomplish the present disclosure are not limited to the distribution and providing way in a manner stored in a non-transitory recording medium freely attachable and detachable relative to the information managing device 105 that includes a Central Processing Unit (CPU), a Read Only Memory (ROM), and a Random Access Memory (RAM), but may be distributed in a manner pre-installed in an attached non-transitory memory device. The programs and data to accomplish the present disclosure may also be distributed in a manner downloaded to other devices over the network connected via a communication line or the like by providing a communication processor.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information managing device that manages target management information held by each of a plurality of information holding servers connected to the information managing device via a network, the information managing device comprising:
    a detector that detects the target management information held by each of the plurality of information holding servers;
    a link information generator that generates link information for accessing the detected target management information via the network;
    an accompanying information obtainer that obtains accompanying information accompanying to the target management information by referring to a scheduling managing server and the plurality of information holding servers in an order predetermined in accordance with types of the accompanying information to be obtained, wherein the schedule managing server is connected to the information managing device via the network and holds schedule data that indicates schedule of a user;
    a classifier that classifies the accompanying information obtained by the accompanying information obtainer in accordance with a predefined layer structure; and
    a display that displays the link information generated by the link information generator in association with the accompanying information classified by the classifier.

2. The information managing device according to claim 1, wherein:
    the target management information is image information; and
    the link information generator generates a scaled-down image, which size is a predefined size, from the target management information as the link information.

3. The information managing device according to claim 1, wherein when the detector detects the same target management information from at least some of the plurality of information holding servers, the display displays the link information for accessing the target management information held by the information holding server of which predefined priority is high, in association with the accompanying information classified by the classifier.

4. The information managing device according to claim 1, wherein the classifier classifies the accompanying information obtained by the accompanying information obtainer in accord with layers whose number is set by a user based on types of the accompanying information to be classified.

5. An information managing method of managing target management information held by each of a plurality of information holding servers connected to an information managing device via a network, the information managing method comprising:
    detecting the target management information held by each of the plurality of information holding servers;
    generating link information for accessing the detected target management information via the network;
    obtaining accompanying information accompanying to the target management information by referring to a scheduling managing server and the plurality of information holding servers in an order predetermined in accordance with types of the accompanying information to be obtained, wherein the schedule managing server is connected to the information managing device via the network and holds schedule data that indicates schedule of a user;
    classifying the accompanying information obtained in the obtaining in accordance with a predefined layer structure; and
    displaying the link information generated in the generating in association with the accompanying information classified in the classifying.

6. A non-transitory computer readable recording medium having stored therein a program for managing target management information held by each of a plurality of information holding servers connected to an information managing device via a network, the program causing a computer connected to the network to function as:
    a detector that detects the target management information held by each of the plurality of information holding servers;
    a link information generator that generates link information for accessing the detected target management information via the network;
    an accompanying information obtainer that obtains accompanying information accompanying to the target management information by referring to a scheduling managing server and the plurality of information holding servers in an order predetermined in accordance with types of the accompanying information to be obtained, the schedule managing server being connected to the information managing device via the network and holding schedule data that indicates schedule of a user;
    a classifier that classifies the accompanying information obtained by the accompanying information obtainer in accordance with a predefined layer structure; and
    a display that displays the link information generated by the link information generator in association with the accompanying information classified by the classifier.

* * * * *